United States Patent [19]

Fritz

[11] Patent Number: 4,572,003

[45] Date of Patent: Feb. 25, 1986

[54] SIDETONE GENERATOR FLOWMETER

[75] Inventor: Robert J. Fritz, Schenectady, N.Y.

[73] Assignee: The United States of America as represented by the United States Department of Energy, Washington, D.C.

[21] Appl. No.: 548,277

[22] Filed: Nov. 3, 1983

[51] Int. Cl.[4] ............................................. G01F 1/20
[52] U.S. Cl. .................................................. 73/861.18
[58] Field of Search ........................ 73/861.18, 861.21

[56] References Cited

U.S. PATENT DOCUMENTS

| | | |
|---|---|---|
| 2,936,619 | 5/1960 | Gibney . |
| 3,021,708 | 2/1962 | November et al. .............. 73/861.18 |
| 3,144,767 | 8/1964 | Testerman et al. . |
| 3,600,612 | 8/1971 | Beeken ........................ 73/861.21 X |
| 3,720,104 | 3/1973 | Zaniter ............................ 73/861.24 |
| 3,930,556 | 1/1976 | Kusuda et al. . |
| 3,948,097 | 4/1976 | Kurita et al. ..................... 73/861.22 |
| 3,958,458 | 5/1976 | Foreman et al. . |

FOREIGN PATENT DOCUMENTS 0100319 6/1982 Japan ................................. 73/861.18

OTHER PUBLICATIONS

Rockwell et al. "Review-Self-Sustaining Oscillations of Flow Past Cavities" in Trans. of the ASME, vol. 100 6/78, pp. 152–165.

Primary Examiner—Herbert Goldstein
Attorney, Agent, or Firm—Judson R. Hightower

[57] ABSTRACT

A flowmeter is provided which uses the sidetones generated in a cavity formed in the wall of a flowpipe or the like in response to fluid flowing past the cavity to provide a measure of the flow velocity of that fluid. The dimensions of the cavity are such as to provide a dominant vibratory frequency which is sensed by a pressure sensor. The flowmeter is adapted for use for a range of frequencies in which the Strouhal number is constant and under these conditions the vibratory frequency is directly related to the flow rate. The tone generator cavity and pressure transducer form a unit which is connected in-line in the flowpipe.

2 Claims, 4 Drawing Figures 4,572,003

SIDETONE GENERATOR FLOWMETER

FIELD OF THE INVENTION

The present invention relates to flowmeters and more particularly, to a flowmeter wherein the vibrational frequency of a sidetone generated when a fluid flows past a cavity in a flowpipe passage is used in measuring the rate of fluid flow.

BACKGROUND OF THE INVENTION

A flowmeter of particular background interest here is that disclosed in Yokogawa Electric Works Bulletin 1F-2A1-G and referred to as the "YEWFLO" (Trademark) flowmeter . This flowmeter, which is described in more detail below, uses vortex tones to provide an indication of flow. A vortex shedder in the form of a trapezoidal rod extends across the pipe in which flow is to be measured takes place, with the large end of the vortex shedder facing upstream. A piezoelectric element is installed inside of the vortex shedder to detect vibratory stresses. The output signal produced by the piezoelectric element is processed and a resultant output proportional to the flow rate is produced and displayed. Other types of vortex flowmeters have also been used which employ different detection methods and different vortexing shapes.

A further arrangement of interest for determining fluid flow rate is that disclosed in U.S. Pat. No. 3,144,767 (Testerman et al). This patent discloses the use of an ultrasonic frequency wave generator as a fluid volumetric flowmeter. The Testerman et al patent provides for interrupting of a gas stream near the orifice, and for placing a cavity below, and preferably perpendicular to, the flowing jet for maximum sensitivity, so as to obtain an amplitude reinforcement of the undulations in the jet by varying the cavity length to a point where the system is caused to oscillate. The edge of the cavity opposite the orifice is said to serve as a means of perturbation of the flowing jet stream. In the embodiment illustrated in the patent, two adjacent blocks are provided with a threaded horizontal inlet passage, a communicating vertical passage and a horizontal orifice passage being formed in one block and a resonant cavity formed in the other block in communication with the orifice of the orifice passage so that the gas stream from the latter flows across the cavity. The patent describes frequency measurements for several gases and provides for measuring such frequencies by placing a microphone near the gas orifice.

Other patents of possible interest include U.S. Pat. Nos. 3,958,458 (Foreman et al); 3,930,556 (Kusuda et al) and 2,936,619 (Gibney). The Foreman et al patent discloses an acoustic emission flow measurement system wherein pseudo-sound created by fluid flow over an unspecified discontinuity is sensed by a transducer. The output of the transducer is reduced to a frequency-amplitude distribution and the amplitude at the characteristic frequency is used to calculate the flow rate. The Kusuda et al patent relates to leak detection, and noise corresponding to a leak is monitored by transducers, and a pair of signals cross-correlated, in attempting to determine the location of the leak. The Gibney patent relates to a device for measuring liquid flow wherein a serrated section is inserted into a pipe and a transducer is affixed to the pipe wall. The output voltage from the transducer is said to be related to the sound intensity and proportional to the flow rate. A constant frequency appears to be employed.

SUMMARY OF THE INVENTION

In accordance with the invention, a sidetone generator fluid flowmeter is provided which detects the frequency of the sidetones generated in a cavity formed in a flowpipe or the like in response to the fluid flow past the cavity and uses this frequency to provide a measurement of the flow velocity of the fluid. The dimensions of the cavity are such as to produce a dominant vibratory frequency and a pressure sensor or transducer is used to sense this dominant vibratory frequency. The generation of such sidetones is discussed below and as explained, the present invention provides flow velocity measurements over a range wherein the Strouhal number is constant so that the vibratory frequency sensed is directly proportional to the flow velocity of the fluid passing by the cavity. The cavity and the associated pressure transducer are mounted as a unit in the wall of the flowpipe so as to be in in-line relationship with the fluid flow.

According to a preferred embodiment thereof, the sidetone generator cavity comprises a cylindrial recess formed in the flowpipe wall and the pressure sensor or transducer is mounted at the bottom of the cylindrical cavity. A cylindrically shaped pizoelectric transducer is preferably used for this purpose with the upper surface thereof forming the bottom wall of the cavity or recess. Advantageously, the side walls of the recess are formed by a mounting in which the pressure transducer is received and which, in turn, is mounted in an opening in the pipe wall.

Other features and advantages of the invention are set forth in, or will be apparent from, the detailed description of the preferred embodiments which follows.

DESCRIPTION OF THE PREFERRED EMBODIMENTS

Figure 1:
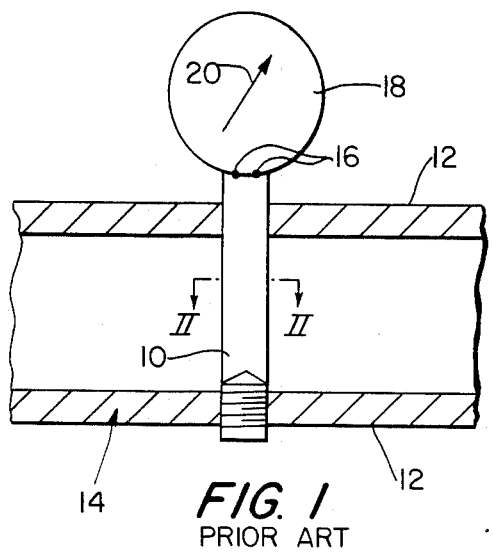
FIG. 1 is a schematic longitudinal cross section of a prior art flowmeter.
Figure 2:
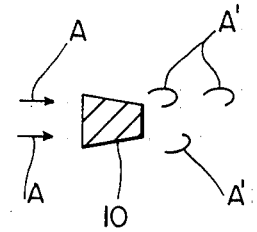
FIG. 2 is a section taken generally along line II—II of FIG. 1.

Referring to FIG. 1, a schematic representation is provided of the "YEWFLO" (Trademark) flowmeter referred to above. As discussed previously, in this type of flowmeter a vortex shedder 10, in the form of a specially shaped rod which extends between the walls 12 of a pipe 14 is used to create a series of swirls or vortexes in the flow of the fluid through the pipe. This is best illustrated in FIG. 2, wherein the cross section of vortex shedder 10 is illustrated. As shown, as the normal flow of fluid, indicated by arrows A, travels past vortex shedder 10, a series of vortexes, indicated at A', are created. Vortex shedder 10 is trapezoidal in cross section (see FIG. 2) and a piezoelectric element, not shown but whose output terminals are indicated at 16, is mounted therein so as to detect stresses caused by the shed vortexes. The frequency of the stress variation signal produced at terminals 16 is processed by a signal processor indicated at 18 which provides conversion of this frequency into an output signal related to flow velocity using the Strouhal relationship as explained below. A display unit, indicated schematically at 20, provides for display of the flow velocity.

Figure 3:
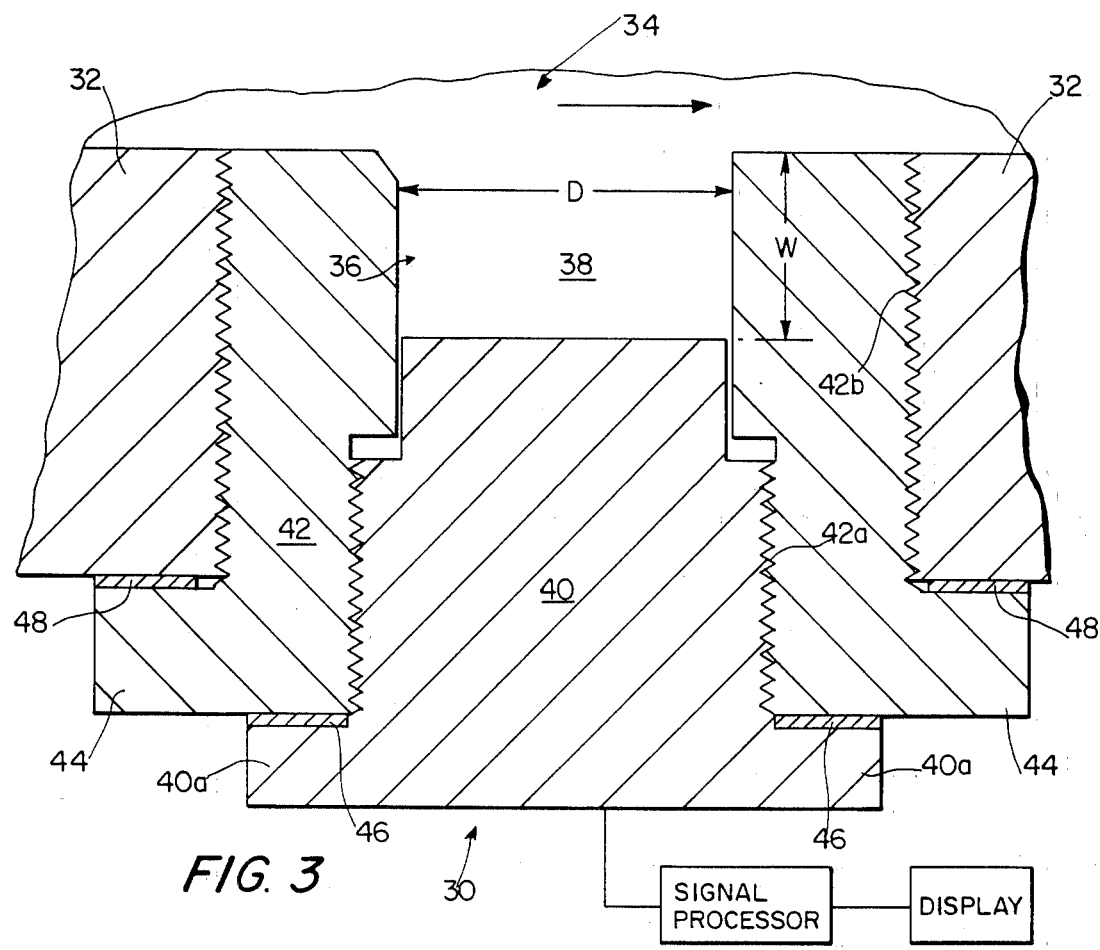
FIG. 3 and 4 are, respectively, a longitudinal cross section and a transverse cross section of a sidetone generator flowmeter constructed in accordance with a preferred embodiment of the invention.
Figure 4:
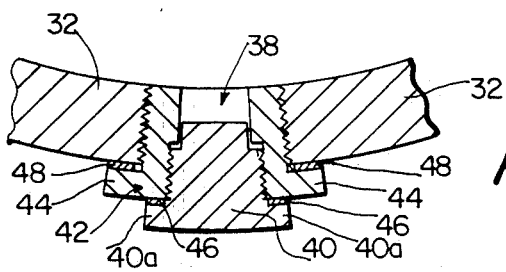

Referring to FIG. 3 and 4, a preferred embodiment of the sidetone generator flowmeter of the invention is illustrated. The sidetone generator flowmeter, which is generally denoted 30, is incorporated in a wall 32 of a pipe generally denoted 34. The sidetone generator itself is indicated at 36 and comprises a circular cavity 38 of a diameter D and depth W formed in the wall 32 of pipe 34.

Before further considering the embodiment of FIGS. 3 and 4, the relationship between the flow velocity and flow tone will be considered. The simplest and most widely investigated flow tone is the vortex tone shed from circular cylinders, and as shown in J. H. Lienhard, "Synopsis of Lift, Drag and Vortex Frequency Data for Rigid Circular Cylinders", Bulletin 300, College of Engineering, Washington State University, 1966, there is a constant Strouhal number S of about 0.2 for Reynolds numbers, R, between about 200 and 100,000 ($10^5$) for a circular cylinder. The Strouhal-Reynolds number relationship is expressed as $S=fD/V$ and $R=vD/\nu$ where f is the vibratory frequency, D is the cylinder diameter, V is the flow velocity upstream of the cylinder and $\nu$ is the kinematic viscosity of the fluid. For the 200 to $10^5$ range set forth above, which corresponds to a velocity range of 500 (maximum velocity/minimum velocity) in which the Strouhal number is constant, the flow velocity is proportional to frequency. Thus, the vibratory frequency is a measure of the flow velocity.

The basic characteristics of sidetone generators are discussed in D. Rockwell and E. Naudasher, "Review—Self-Sustaining Oscillations of Flow Past Cavities", ASME Journal of Fluids Engineering, V. 100, June 1970, pp 152-165. As discussed in this reference, for a rectangular cavity of width L and depth W, wherein $L/W=1.5$, the dominant vibration has a frequency f, Where $f=F/L$. Circular cavities possess similar characteristics and as set forth in the reference, the signal produced can be modified by shaping of the cavity edges.

Referring again to FIGS. 3 and 4, the sidetone generator flowmeter 30 further includes a pressure sensitive transducer unit 40, preferably in the form of piezoelectric transducer, which located at the bottom of cavity 38 and the upper surface of which forms the bottom wall of cavity 38. The sides of transducer 40 are provided with screw threading and unit 40 is screwed into a threaded opening 42a in a transducer mounting 42. The outside surface of mounting 42, includes screw threading 42b and mounting 42 is, in turn, screwed into pipe wall 32, as illustrated. Transducer mounting 42 includes a lower part-cylindrical flange 44,44 and copper gaskets 46,46 and 48,48 are, respectively, disposed between the lower surface of flanges 44,44 and similarly shaped flanges 40a,40a of transducer 40 and between the upper surfaces of flanges 44,44 and the lower surface of pipe wall 32, as illustrated in FIGS. 3 and 4.

A chamfer 50 is provided on the upstream edge of cavity 38 (housing 42) to increase the vibratory signal. The depth W of cavity 38 is relatively shallow and thus the natural frequencies of the cavity will be higher than the vibratory frequencies. The vibratory signal detected by transducer 40 will have a dominant frequency proportional to velocity as explained above ($S=fD/V$). In a specific example, a Model 112A piezoelectric transducer, manufactured by PCB Piezotronics, P.0. Box 33, Buffalo, N.Y. 14225 (Catalog 375) was used as the pressure transducer 40. This transducer has a base diameter of 0.218 inches, and with a corresponding diameter D of 0.22 inches, the tone frequency becomes 545 Hz for a flow velocity of 10 ft/sec using the formula set forth above. The pressure signal would be about 0.1 psi in amplitude or about 180 /dB.

As indicated in FIG. 3, the output of pressure transducer 40 is connected to a signal processor 50 which is connected, in turn, to a display 52. In an exemplary embodiment, a frequency responsive meter can be used which is directly calibrated in flow velocity or volume flow rate.

Although the invention has been described relative to a preferred embodiment thereof, it will be understood that variations and modifications can be effected in this exemplary embodiment without departing from the scope and spirit of the invention.

I claim:

1. A device for measuring the velocity of fluid flow along an enclosed path in a velocity range in which the Strouhal number is constant, said device comprising:

sidetone generator means, comprising a cavity in a wall defining the flow path for the fluid flow, for generating a side tone during the flow of fluid past the cavity in said velocity range in which the Strouhal number is constant, the dimensions of said cavity being such as to produce a dominant vibratory frequency within said cavity;

pressure sensing means for sensing the dominant vibratory frequency produced in said cavity responsive to the flow of fluid past the cavity; and meter meand responsive to the dominant vibratory frequency sensed by said pressure sensing means for providing an indication of the flow velocity of the fluid flowing past the cavity;

said caity being formed in the wall of a pipe and conprising a recess in said pipe wall, and a chamfer being formed on the upstream edge of said recess.

2. A device for measuring the velocity of fluid flow along an enclosed path in a velocity range in which the Strouhal number is constant, said device comprising:

sidetone generator means, comprising a cavity in a wall defining the flow path for the fluid flow, for generating a side tone during the flow of fluid past the cavity in said velocity range in which the Strouhal number is constant, the dimensions of said cavity being such as to produce a dominant vibratory frequency within said cavity;

pressure sensing means for sensing the dominant vibratory frequency produced in said cavity responsive to the flow of fluid past the cavity; and meter means responsive to the dominant vibratory frequency sensed by said pressure sensing means for providing an indication of the flow velocity of the fluid flowing past the cavity;

said cavity being formed in the wall of a pipe and comprising a recess in said pipe wall, and said pressure sensing means comprising a pressure transducer removably mounted in a central aperture in a mounting member received in an opening in the pipe wall, said recess being formed by the walls of said mounting member defining said central aperture and by the upper surface of said pressure transducer.

* * * * *